United States Patent
Yashiki et al.

(10) Patent No.: US 12,411,806 B2
(45) Date of Patent: Sep. 9, 2025

(54) CONTROL OF DELETING UNNECESSARY DATA FILES AFTER STORING GENERATED DATA FILES IN EXTERNAL STORAGE AREA

(71) Applicant: PFU LIMITED, Ishikawa (JP)

(72) Inventors: Mitsuhiro Yashiki, Ishikawa (JP); Yuta Hashimoto, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 18/458,693

(22) Filed: Aug. 30, 2023

(65) Prior Publication Data

US 2024/0086365 A1    Mar. 14, 2024

(30) Foreign Application Priority Data

Sep. 14, 2022 (JP) ................ 2022-146260

(51) Int. Cl.
*G06F 16/16* (2019.01)
*G06F 16/14* (2019.01)

(52) U.S. Cl.
CPC .......... *G06F 16/162* (2019.01); *G06F 16/148* (2019.01)

(58) Field of Classification Search
CPC .... G06F 16/162; G06F 16/148; G06F 3/0652; G06F 16/93; G10H 2220/451; G06T 2207/30176; G06V 10/10; G03G 2215/0436
See application file for complete search history.

(56) References Cited

U.S. PATENT DOCUMENTS

| | | | | |
|---|---|---|---|---|
| 2002/0051065 | A1* | 5/2002 | Takahashi | H04N 5/76 386/E5.072 |
| 2007/0162525 | A1* | 7/2007 | Abe | G06F 16/162 |
| 2008/0215598 | A1* | 9/2008 | Haga | G06F 16/162 |
| 2008/0243940 | A1* | 10/2008 | Kato | G06F 21/6218 |
| 2008/0270480 | A1* | 10/2008 | Hanes | G06F 16/162 |
| 2009/0063586 | A1* | 3/2009 | Jung | G06F 16/51 707/999.203 |
| 2010/0079797 | A1* | 4/2010 | Ohara | H04N 1/32101 358/1.15 |
| 2010/0185750 | A1* | 7/2010 | Nakayama | H04N 1/00464 709/219 |
| 2010/0328739 | A1* | 12/2010 | Saida | H04N 1/00461 358/498 |
| 2011/0004789 | A1* | 1/2011 | Tsujimoto | H04N 1/32678 714/E11.131 |
| 2012/0162712 | A1 | 6/2012 | Shibao | |

(Continued)

FOREIGN PATENT DOCUMENTS

| | | |
|---|---|---|
| JP | 2012-142680 A | 7/2012 |
| JP | 2018-107604 A | 7/2018 |

(Continued)

*Primary Examiner* — William P Bartlett
(74) *Attorney, Agent, or Firm* — Rimon P.C.

(57) ABSTRACT

A data file generation apparatus includes circuitry. The circuitry generates a data file. The circuitry writes the data file to an external storage area that is external to the data file generation apparatus. The circuitry writes identification information of the data file to the external storage area as deletion candidate information indicating a candidate for a file to be deleted. The circuitry deletes the deletion candidate information when the data file is successfully stored in the external storage area.

10 Claims, 8 Drawing Sheets

(56) References Cited

U.S. PATENT DOCUMENTS

| | | | |
|---|---|---|---|
| 2013/0132447 A1* | 5/2013 | Maeda | G06F 16/162 |
| | | | 707/821 |
| 2013/0233927 A1* | 9/2013 | Suzuki | G06K 7/1439 |
| | | | 235/462.04 |
| 2014/0002859 A1* | 1/2014 | Isoda | H04N 1/00225 |
| | | | 358/1.15 |
| 2018/0183960 A1 | 6/2018 | Esaki | |
| 2019/0391770 A1* | 12/2019 | Sakuragi | H04N 1/4413 |
| 2020/0162632 A1 | 5/2020 | Fukushima | |
| 2023/0418535 A1* | 12/2023 | Imai | G06F 3/1256 |

FOREIGN PATENT DOCUMENTS

| | | |
|---|---|---|
| JP | 2020-88683 A | 6/2020 |
| JP | 2021-87110 A | 6/2021 |

\* cited by examiner

SCAN LIST

| No | File name |
|---|---|
| 1 | 20220523112323 |
| 2 | 20220523112324_(1) |
| 3 | 20220523112345 |
| 4 | 20220523112412 |
| 5 | 20220523112458_(1) |

CONTROL OF DELETING UNNECESSARY DATA FILES AFTER STORING GENERATED DATA FILES IN EXTERNAL STORAGE AREA

CROSS-REFERENCE TO RELATED APPLICATION

This patent application is based on and claims priority pursuant to 35 U.S.C. § 119(a) to Japanese Patent Application No. 2022-146260, filed on Sep. 14, 2022, in the Japan Patent Office, the entire disclosure of which is hereby incorporated by reference herein.

BACKGROUND

Technical Field

Embodiments of the present disclosure relate to a data file generation apparatus, a data file generation method, and a non-transitory computer-executable medium.

Related Art

For example, an image reading apparatus that can communicate with an external apparatus is known in the art. The image reading apparatus includes a receiving means for receiving an instruction to transmit image data to the external apparatus using a protocol selected from multiple transmission protocols. The image reading apparatus includes a reading means for reading a document of multiple sheets in response to receiving the instruction by the receiving means to generate image data. The image reading apparatus includes an inquiry means for, every time the reading means reads one sheet of the document, making an inquiry inquiring whether to read another sheet of the document or to end reading to a user. The image reading apparatus includes a sequential transmission means for transmitting the image data generated by the reading means to the external apparatus every time the reading means reads the one sheet of the document using the protocol selected in the instruction the receiving means receives. The image reading apparatus includes a storage-type transmission means for storing the image data generated from the document read by the reading means in a memory until a response indicating that reading has been ended is received and transmitting the stored image data to the external apparatus using the selected protocol as a response to the inquiry by the inquiry means.

The image reading apparatus includes a control means for controlling transmission of the image data read and generated by the reading means such that when the selected protocol is a protocol with timeout for a session established between the image reading device and the external device, then transmits the image data by storage-type transmission means, and when the selected protocol is a protocol without timeout, then transmits the image data by sequential transmission means.

Further, an image reading apparatus is known in the related art that includes a screen display means for displaying an operation screen that receives a user operation. The image reading apparatus includes a scan data generation means for reading a document in response to receiving an instruction to scan the document on the operation screen, to generate scan data. The image reading apparatus includes a storage destination reception means for receiving, on the operation screen, designation of a storage destination in which the scan data is to be stored. The image reading apparatus includes a file name generation means for automatically generating a file name of the scan data in response to receiving, on the operation screen, an instruction to automatically generate a file name. The image reading apparatus includes a scan data storage means for storing the scan data in the designated storage destination with the automatically generated file name. The image reading apparatus includes a display means for performing a display for receiving, on the operation screen, an instruction to delete the scan data when the scan data is stored with the automatically generated file name.

Further, an image reading apparatus is known in the related art that includes a reading unit configured to read an image from a document, a communication unit configured to communicate with a first external device and a second external device, a storage unit, and a control unit. The control unit performs a generation process of controlling the reading unit to read the image from the document to generate image data when the first external device and the second external device are designated as transmission destinations to which the image data of the document is to be stored. The control unit performs a storing process of storing the generated image data of the document in the storage unit. The control unit performs a first transmission process of controlling the communication unit to transmit the image data stored in the storage unit by the storing process to the first external device. The control unit performs a first determination process of determining whether transmission of the image data to the first external device by the first transmission process is successful. The control unit performs a second transmission process of controlling the communication unit to transmit the image data stored in the storage unit to the second external device. The control unit performs a second determination process of determining whether transmission of the image data to the second external device by the second transmission process is successful. The control unit performs a deletion process of controlling the communication unit to transmit a deletion instruction instructing deletion of the image data to the first external device, when the control unit determines that the transmission of the image data to the first external device is successful in the first determination process and determines that the transmission of the image data to the second external device is unsuccessful in the second determination process.

Further, a transmission apparatus including a scanner is known in the related art. The transmission apparatus includes a first control means for controlling reading a document of a plurality of pages using the scanner to generate image data. The transmission apparatus includes a second control means for performing conversion processing on the generated image data. The transmission apparatus includes a third control means for controlling transmission of data on which the conversion processing has been performed to an external apparatus through a network. The third control means starts a session while the reading of the document is being performed under control by the first control means and transmits data on which the conversion processing has been performed to the external apparatus through the network. The third control means disconnects the started session when an error occurs in the scanner during the reading of the document, connects the session again when the error is resolved, and transmits the data on which the conversion processing has been performed to the external apparatus through the network.

SUMMARY

According to an embodiment of the present disclosure, a data file generation apparatus includes circuitry. The circuitry generates a data file. The circuitry writes the data file to an external storage area that is external to the data file generation apparatus. The circuitry writes identification information of the data file to the external storage area as deletion candidate information indicating a candidate for a file to be deleted. The circuitry deletes the deletion candidate information when the data file is successfully stored in the external storage area.

According to an embodiment of the present disclosure, a data file generation apparatus includes circuitry. The circuitry writes a data file to an external storage area that is external to the data file generation apparatus. The circuitry writes identification information of the data file to the external storage area as deletion candidate information indicating a candidate for a file to be deleted. The circuitry searches the external storage area for the deletion candidate information. In a case that the circuitry finds the deletion candidate information, the circuitry deletes the data file from the external storage area based on the deletion candidate information.

According to an embodiment of the present disclosure, a data file generation method includes generating a data file. The data file generation method includes writing the data file to an external storage area. The data file generation method includes writing identification information of the data file to the external storage area as deletion candidate information indicating a candidate for a file to be deleted. The data file generation method includes deleting the deletion candidate information when the data file is successfully stored in the external storage area.

According to an embodiment of the present disclosure, a non-transitory computer-executable medium storing a plurality of instructions which, when executed by a processor, causes the processor to perform a method. The method includes generating a data file. The method includes writing the data file to an external storage area. The method includes writing identification information of the data file to the external storage area as deletion candidate information indicating a candidate for a file to be deleted. The method includes deleting the deletion candidate information when the data file is successfully stored in the external storage area.

According to an embodiment of the present disclosure, a data file generation method includes writing a data file to an external storage area. The data file generation method includes writing identification information of the data file to the external storage area as deletion candidate information indicating a candidate for a file to be deleted. The data file generation method includes searching the external storage area for the deletion candidate information; and in a case that the deletion candidate information is found, deleting the data file from the external storage area based on the deletion candidate information.

According to an embodiment of the present disclosure, a non-transitory computer-executable medium storing a plurality of instructions which, when executed by a processor, causes the processor to perform a method. The method includes writing a data file to an external storage area. The method includes writing identification information of the data file to the external storage area as deletion candidate information indicating a candidate for a file to be deleted. The method includes searching the external storage area for the deletion candidate information. The method includes, in a case that the deletion candidate information is found, deleting the data file from the external storage area based on the deletion candidate information.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
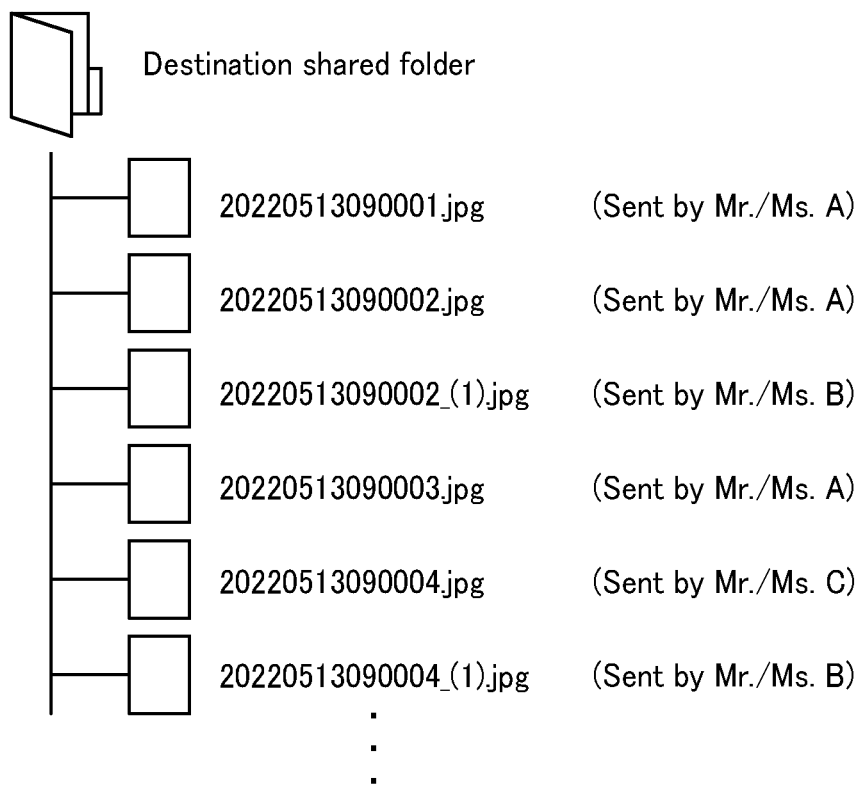
FIG. 1 is a diagram illustrating contents of a shared folder in an external storage apparatus in which a data file transmitted by a traditional reading apparatus is stored.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a diagram illustrating contents of a shared folder in an external storage apparatus in which a data file transmitted by a reading apparatus is stored, according to the related art.

A description is given of the reading apparatus of FIG. 1.

The reading apparatus that can convert a document of a paper medium to electronic data can enhance efficiency of document management work. However, when electronic data that is obtained by scanning is transmitted to an external storage apparatus, if the scanning or the transmission is canceled, the electronic data remains in the external storage apparatus even though the electronic data is unnecessary. Such unnecessary electronic data may hinder the document management work.

Specifically, a reading apparatus that stores electronic data obtained by scanning in an external storage apparatus connected to a network generates a file from the electronic data obtained by scanning in accordance with a specific naming rule and stores the file in the external storage apparatus. In a case where multiple users use different reading apparatuses, each reading apparatus generates files from scan data by applying a naming rule, and stores the files in the same external storage apparatus. Because the naming rule is applied, files with the same name will not be generated and overwritten, but each file will be mixed as illustrated in FIG. 1. When one wants to scan the document again, the stored file has to be deleted because the file is unnecessary. In this case, one has to access the external storage apparatus and check a file name, or to open a file and check a content of the file, to determine whether the file is the one transmitted by himself/herself. This causes a drawback that it takes efforts to delete a file, and work efficiency decreases.

According to the embodiments of the present disclosure, such an unnecessary document is prevented from being left in the external storage apparatus. As a result, the efficiency of the document management work can be enhanced.

Embodiments of the present disclosure are described with reference to the drawings.

Figure 2:
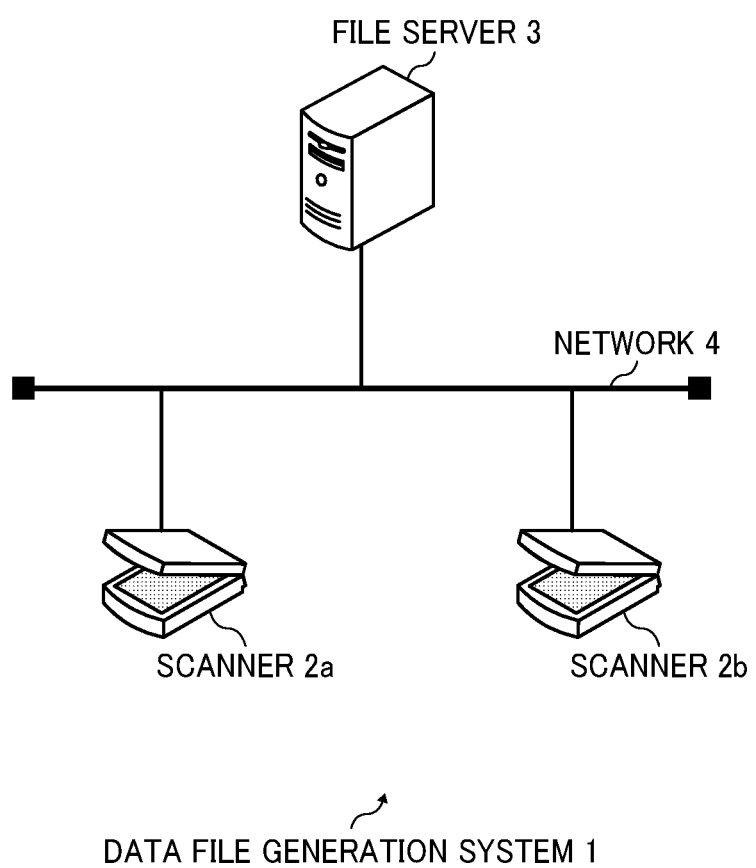
FIG. 2 is a diagram illustrating an overall configuration of a data file generation system, according to an embodiment of the present disclosure.

FIG. 2 is a diagram illustrating an overall configuration of a data file generation system 1, according to the present embodiment.

As illustrated in FIG. 2, the data file generation system 1 includes a scanner 2a, a scanner 2b, and a file server 3, which are connected to one another through a network 4. The scanner 2a and the scanner 2b are referred to simply as scanner 2.

The scanner 2 is a network scanner used by a user. For example, the scanner 2 scans an image on a document and stores the data file of image data obtained by scanning the image in the file server 3 according to the user's operation. The scanner 2 according to the present embodiment serves as a data file generation apparatus. The scanner 2 generates scan information of a document as a scan list and stores the scan list in the file server 3. The scanner 2 deletes an unnecessary data file generated by the scanning processing of the document on the basis of the scan list. The scanner 2 and the file server 3 can communicate with a file transfer protocol (FTP).

The file server 3 is a computer terminal that is shared by multiple scanners 2 and stores the data files generated by the scanners 2. The file server 3 according to the present embodiment serves as an external storage area. The file server 3 stores the scan list generated by the scanner 2.

Figure 3:
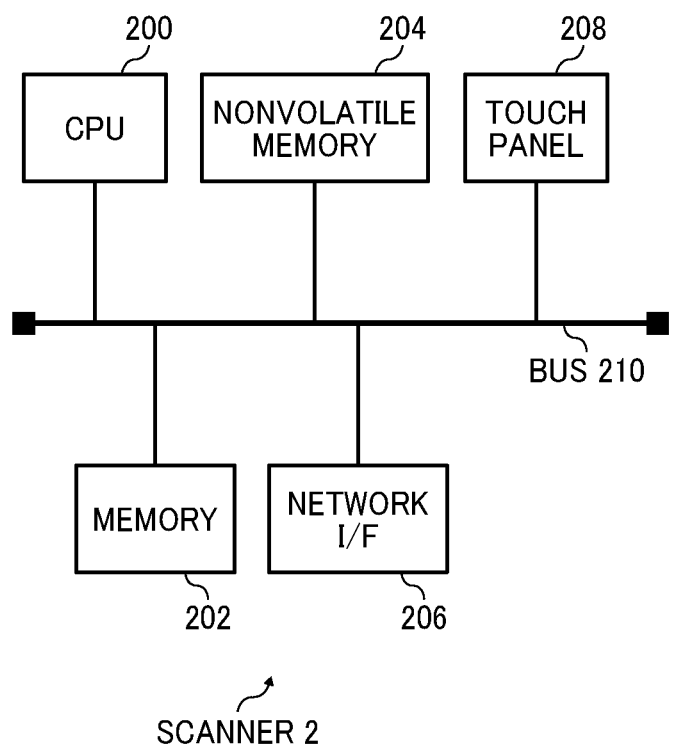
FIG. 3 is a diagram illustrating a hardware configuration of a scanner, according to an embodiment of the present disclosure.

FIG. 3 is a diagram illustrating a hardware configuration of the scanner 2 according to the present embodiment.

As illustrated in FIG. 3, the scanner 2 includes a central processing unit (CPU) 200, a memory 202, which is volatile, a nonvolatile memory 204, a network interface 206 (network IF 206), and a touch panel 208.

These components are connected to one another via a bus 210.

The CPU 200 is, for example, a central processing unit.

The memory 202 is, for example, a volatile memory and functions as a main storage device.

The nonvolatile memory 204 stores, for example, a computer program (e.g., a data file generation program 22 illustrated in FIG. 4) and other data files as a nonvolatile storage device.

The network IF 206 is an interface for wired or wireless communication.

The touch panel 208 serves as an operation screen according to an embodiment of the present disclosure.

The touch panel 208 is, for example, a liquid crystal touch panel.

Figures 4, 5:
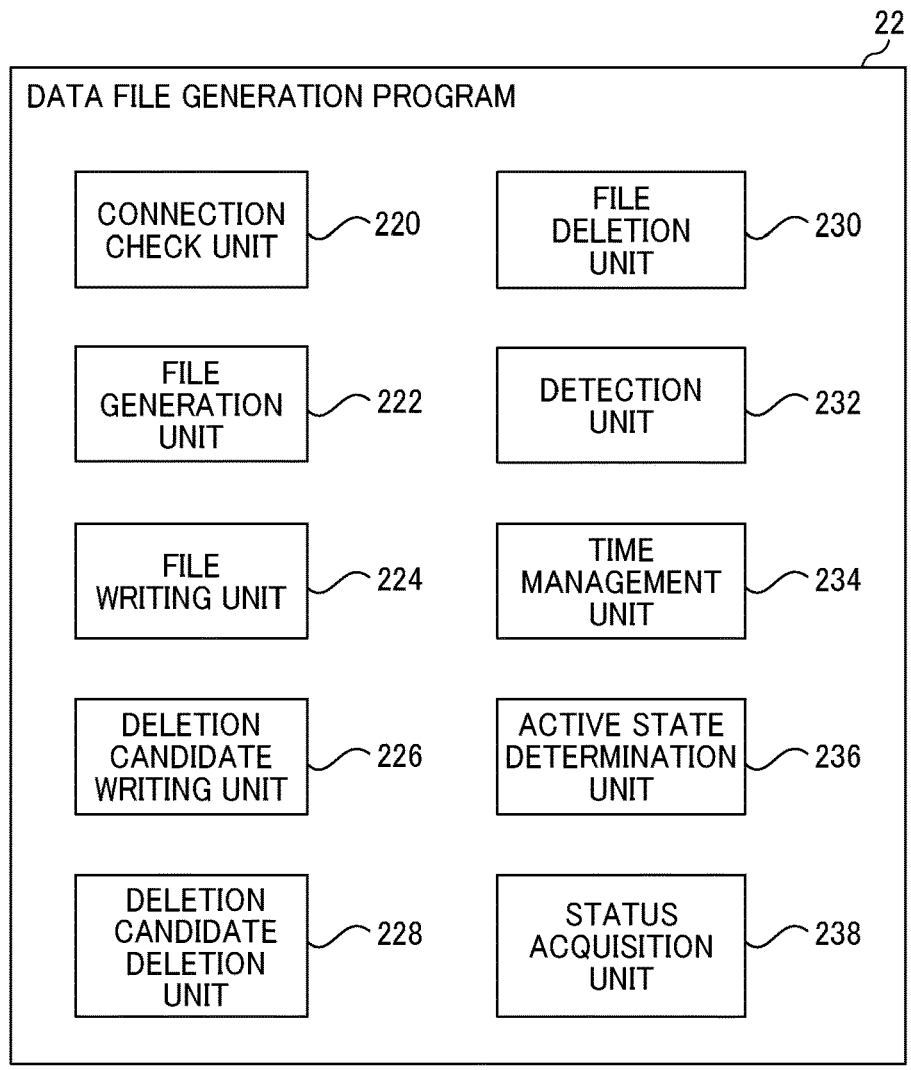
FIG. 4 is a diagram illustrating a functional configuration of the scanner of FIG. 3, according to an embodiment of the present disclosure.
FIG. 5 is a diagram illustrating a scan list, according to an embodiment of the present disclosure.

FIG. 4 is a diagram illustrating a functional configuration of the scanner 2, which is implemented by the scanner 2 according to the data file generation program 22, according to the present embodiment.

As illustrated in FIG. 4, the data file generation program 22 is installed in the scanner 2 of the present embodiment.

The data file generation program 22 is stored in, for example, a storage medium such as a compact disc read-only memory (CD-ROM), and is installed in the scanner 2 via the storage medium. Alternatively or additionally, the data file generation program 22 is stored in a program provision server on the Internet, is downloaded from the program provision server through a network, and is installed in the scanner 2.

The functional configuration implemented by the data file generation program 22 includes a connection check unit 220, a file generation unit 222, a file writing unit 224, a deletion candidate writing unit 226, a deletion candidate deletion unit 228, a file deletion unit 230, a detection unit 232, a time management unit 234, an active state determination unit 236, and a status acquisition unit 238.

A part or all of the functional configuration of the data file generation program 22 may be implemented by hardware such as an application specific integrated circuit (ASIC) or may be implemented by using a part of functions of an operating system (OS).

In the data file generation program 22, the connection check unit 220 checks whether the scanner 2 is connected to the network 4. Further, the connection check unit 220 checks a connection status between the scanner 2 and the file server 3.

The file generation unit 222 scans a document and generates a data file of the scanned document. Specifically, file generation processing by the file generation unit 222 is consecutive scanning processing of the document. Further, the file generation unit 222 assigns a file name to the generated data file in accordance with a naming rule. In the present embodiment, the time, such as year, month, day, hour, minute, and second, when the data file is generated is used as the file name.

The file writing unit 224 writes the data file generated by the file generation unit 222 into the file server 3. The file writing unit 224 consecutively writes multiple data files to the file server 3.

The deletion candidate writing unit 226 writes, to the file server 3, identification information of the data file written by the file writing unit 224 as deletion candidate information indicating a candidate for a file to be deleted. Specifically, as illustrated in FIG. 5, the deletion candidate information is the scan list of document information scanned by the file generation unit 222. More specifically, the deletion candidate information is a list of the file names of the generated data files. The deletion candidate writing unit 226 generates the scan list as a temporary file, and stores the scan list in the file server 3 using folder sharing or a network protocol such as FTP. When a scan job fails due to, for example, disconnection of the network 4, the scan list transmitted to the file server 3 is treated as an inconsistent data list.

Further, when the file writing unit 224 consecutively writes multiple data files to the file server 3, the deletion candidate writing unit 226 additionally writes the scan list concurrently with the writing processing.

The deletion candidate deletion unit 228 deletes the scan list written by the deletion candidate writing unit 226 when the predetermined data file is successfully recorded in the file server 3. Further, when the multiple data files consecutively generated by the file generation unit 222 are successfully recorded by the file writing unit 224, the deletion candidate deletion unit 228 deletes the scan list relating to the multiple data files from the file server 3.

The file deletion unit 230 searches the file server 3 for the scan list, and when the scan list is found, deletes the data file from the file server 3 on the basis of the scan list. Specifically, the file deletion unit 230 generates a deletion command conforming to the OS such as an rm command of Linux® on the basis of the scan list and transmits the generated deletion command, to delete the data file.

Further, when the file generation processing by the file generation unit 222 or the data file writing processing by the file writing unit 224 is canceled, the file deletion unit 230 deletes the data file from the file server 3 by referring to the scan list written in the file server 3.

Further, the file deletion unit 230 searches the file server 3 for the scan list at a predetermined point in time, and deletes the data file from the file server 3 according to the scan list. Specifically, when the file deletion unit 230 is notified by the time management unit 234 (described below) that the predetermined point in time has arrived, the file deletion unit 230 searches the file server 3 for the scan list and deletes the data file from the file server 3 according to the scan list.

The file deletion unit 230 searches for a scan list written in the file server 3 by another scanner 2. When the file deletion unit 230 finds the scan list written by another scanner 2, the file deletion unit 230 deletes a data file from the file server 3 on the basis of the scan list.

Specifically, the file deletion unit 230 does not delete the data file on the basis of the scan list when the active state determination unit 236 (described below) determines that the scan list written by another scanner 2 is active.

Alternatively, the file deletion unit 230 may search the file server 3 for the scan list at a predetermined point in time, and move the data file to be deleted from an area within the file server 3 where the data file is currently stored to another storage area that is external to the scanner 2 in accordance with the scan list. Specifically, like a move command of Linux c), the file deletion unit 230 moves the data file from a folder in which the data file is stored to a trash folder, a temporary folder for deletion, or a default folder. Thus, a user can determine whether to delete the data file completely. Further, the deleted data file can be restored.

The detection unit 232 detects an operation performed on the touch panel 208 of the scanner 2 by a user. Specifically, the detection unit 232 detects that a cancel key for canceling scanning of a document is touched by a user or key for selecting whether to store a data file after completion of scanning of multiple documents is touched by a user.

The time management unit 234 determines whether a predetermined point in time has arrived. Specifically, the time management unit 234 determines whether a set time (e.g., a predetermined time on a daily, weekly, or monthly basis) has come.

The active state determination unit 236 determines whether a scan list generated by another scanner 2 and present in the file server 3 is in an active state or in an inactive state. Specifically, the active state determination unit 236 determines that the scan list is in an active state when the scan list generated by another scanner 2 is locked, when the file name indicates an active state, or when the scan list is monitored and updated for a certain period of time.

The status acquisition unit 238 acquires an operating status of the scanner 2. Specifically, the status acquisition unit 238 determines whether the scanner 2 is on standby.

Figure 6:
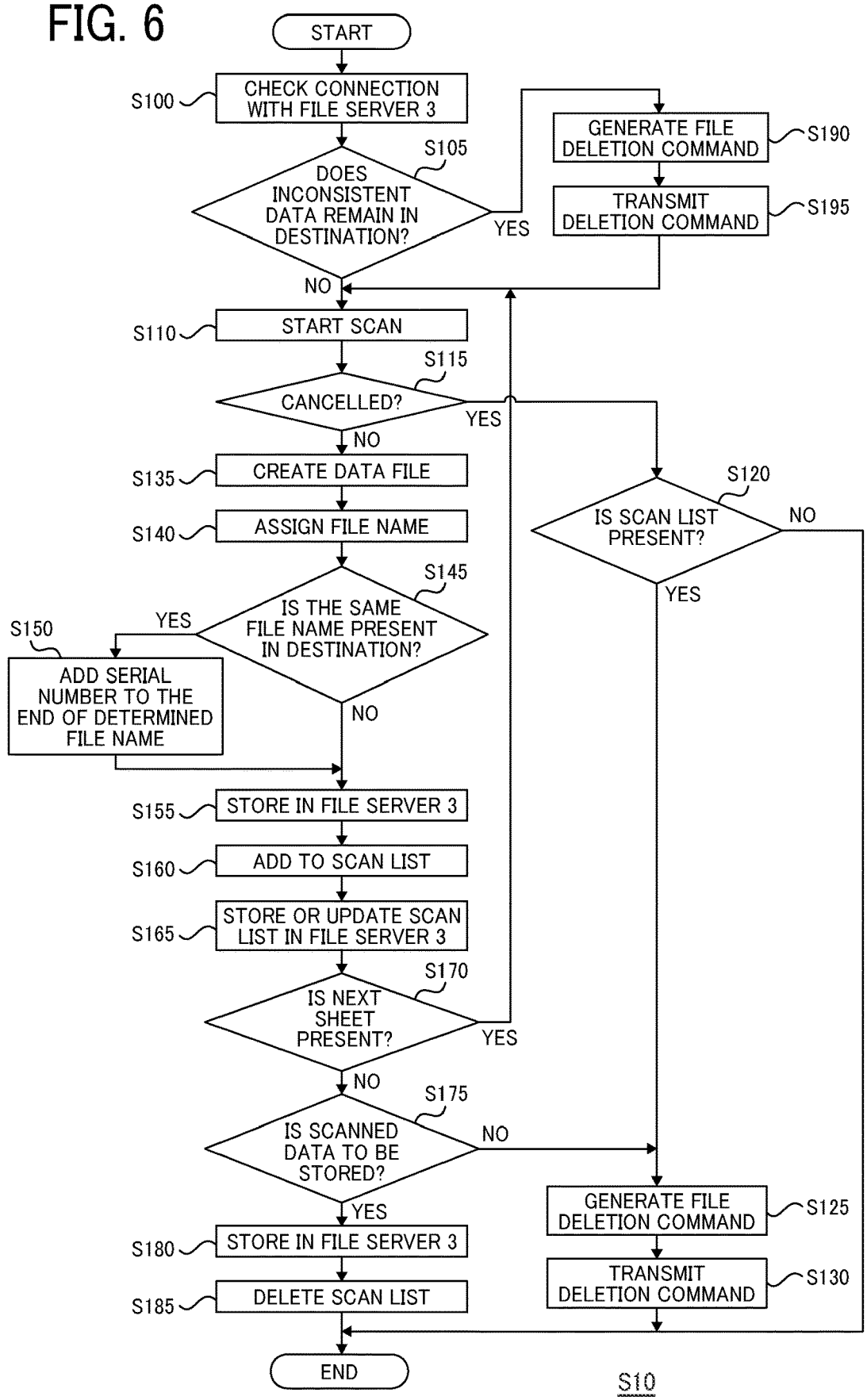
FIG. 6 is a flowchart of data file deletion processing by the scanner of FIG. 3, according to an embodiment of the present disclosure.

FIG. 6 is a flowchart of data file deletion processing (S10) by the scanner 2, according to the present embodiment.

First, a case in which the data file deletion processing (S10) of FIG. 6 is performed to cancel scanning during scanning of a document of multiple pages according to a user's operation is described.

In step 100 (S100), the connection check unit 220 checks the connection with the file server 3. In step 105 (S105), the file deletion unit 230 determines whether an inconsistent data list remains in the file server 3. When the file deletion unit 230 determines that no inconsistent data list remains (S105: No), the operation proceeds to S110. When the file deletion unit 230 determines that an inconsistent data list remains (S105: Yes), the operation proceeds to S190.

In step 110 (S110), the file generation unit 222 of the scanner 2 starts scanning the document.

Figure 7A:
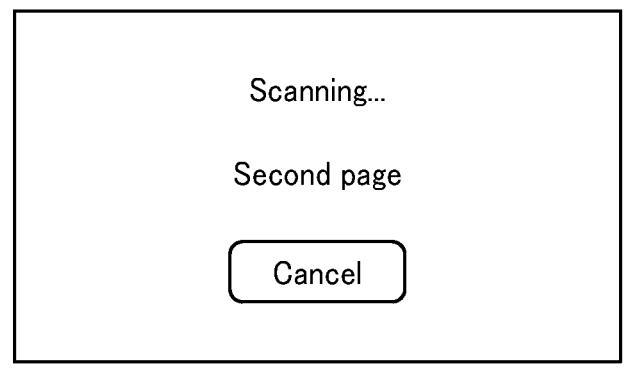
FIG. 7A illustrates a screen of a touch panel displayed during scanning of a document, according to an embodiment of the present disclosure.

In step 115 (S115), when the detection unit 232 detects that a cancel key illustrated in FIG. 7A is touched by a user (S115: Yes), the operation proceeds to S120. When the detection unit 232 does not detect that the cancel key is touched (S115: No), the operation proceeds to S135.

In step 120 (S120), the scanner 2 stops sheet feeding, and determines whether a scan list is present. A scan list is generated for one or more pages of the document scanned before the sheet feeding is stopped. When the scan list is present (S120: Yes), the operation proceeds to S125. For example, when the scanning is cancelled while reading the first page of the document, no scan list is generated. When no scan list is present, the operation ends.

In step 125 (S125), the file deletion unit 230 creates a deletion command on the basis of a file name in the scan list and a transmission destination folder path.

In step 130 (S130), the file deletion unit 230 transmits the created deletion command to a target file, and thus the data file is deleted from the file server 3.

A case in which all pages of the documents are scanned and storing of a data file is cancelled after completion of the scanning is described below.

When the scanning of the document continues without being canceled in S115, in step 135 (S135), the file generation unit 222 generates a data file of the scanned page.

In step 140 (S140), the file generation unit 222 determines a file name of the generated data file in accordance with the naming rule, and assigns the determined file name to the data file. In the present embodiment, the file generation unit 222 determines the file name on the basis of the year, month, day, hour, minute, and second when the data file is generated.

In step 145 (S145), the file writing unit 224 searches a destination folder path of the data file to determine whether the same file name is present in the destination folder path. When the same file name is present (S145: Yes), the operation proceeds to S150. When no same file name is present (S145: No), the operation proceeds to S155.

In step 150 (S150), the file generation unit 222 adds a serial number to the end of the assigned file name to prevent a data file having the same file name from being transmitted to the destination folder.

In step 155 (S155), the file writing unit 224 stores the data file that is generated and named by the file generation unit 222 in the file server 3.

In step 160 (S160), the deletion candidate writing unit 226 adds identification information of the data file stored by the file writing unit 224 to the scan list.

In step 165 (S165), the deletion candidate writing unit 226 stores the scan list to which the identification information is added in the file server 3 or updates to the scan list.

In step 170 (S170), when there is a page to be scanned subsequently (S170: Yes), the operation proceeds to S110. When all pages of the document are scanned (S170: No), the operation proceeds to S175.

Figure 7B:
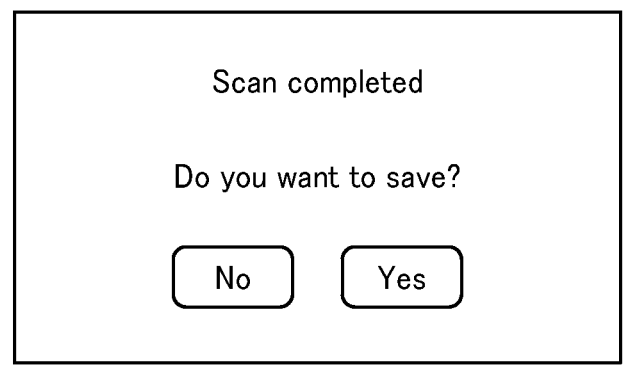
FIG. 7B illustrates a screen of a touch panel displayed when scanning of a document is completed, according to an embodiment of the present disclosure.

In step 175 (S175), when "No" is touched and selected by a user in a window illustrated in FIG. 7B inquiring whether to store data obtained by scanning and the detection unit 232 detects the selection of "No" (S175: No), the operation proceeds to S125.

Since the scanning of the multiple pages of the document is completed and scan information of the document is stored in the scan list by the deletion candidate writing unit 226, the file deletion unit 230 creates a deletion command on the basis of the scan list in S125. In S130, the file deletion unit 230 deletes the file. Thus, even when the scanned data is not stored, an unnecessary file does not remain in the file server 3.

In step 175 (S175), when the user selects "Yes" and the detection unit 232 detects the selection of "Yes" (S175: Yes), the operation proceeds to S180.

In step 180 (S180), the file writing unit 224 stores the data file generated by the file generation unit 222 in the file server 3.

In step 185 (S185), the deletion candidate deletion unit 228 deletes the scan list written by the deletion candidate writing unit 226 from the file server 3.

A case in which a network is disconnected during scanning of a document of multiple pages is described below.

Specifically, a case in which the network 4 is disconnected during execution of a scanning job and a scan list remains in the file server 3 as an inconsistent data list is described.

In S100, the connection check unit 220 checks connection with the file server 3. In S105, the file deletion unit 230 checks whether an inconsistent data list generated by the scanner 2 itself remains in the file server 3. Until the network 4 is disconnected, a data file of a scanned page is generated, a file name is assigned to the data file, and the data file to which the file name is assigned is transmitted to the file server 3. Further, in the file server 3, the scan list is stored and updated as a temporary file. When the network 4 is disconnected, scanning of the document fails, and thus the scan list stored in the file server 3 becomes an inconsistent data list. When the scan job is executed again under the above conditions according to the user's operation, in S105, the file deletion unit 230 determines that the inconsistent data list at the time of the disconnection of the network 4 remains in the file server 3 (S105: Yes). Thus, the operation proceeds to S190.

In step 190 (S190), the file deletion unit 230 creates a deletion command on the basis of a file name in the scan list as the inconsistent data list and a transmission destination folder path.

In step 195 (S195), the file deletion unit 230 transmits the deletion commands of each target file in the inconsistent data list and deletes target files. When the deletion is completed, the deletion candidate deletion unit 228 deletes the inconsistent data list.

Figure 8:
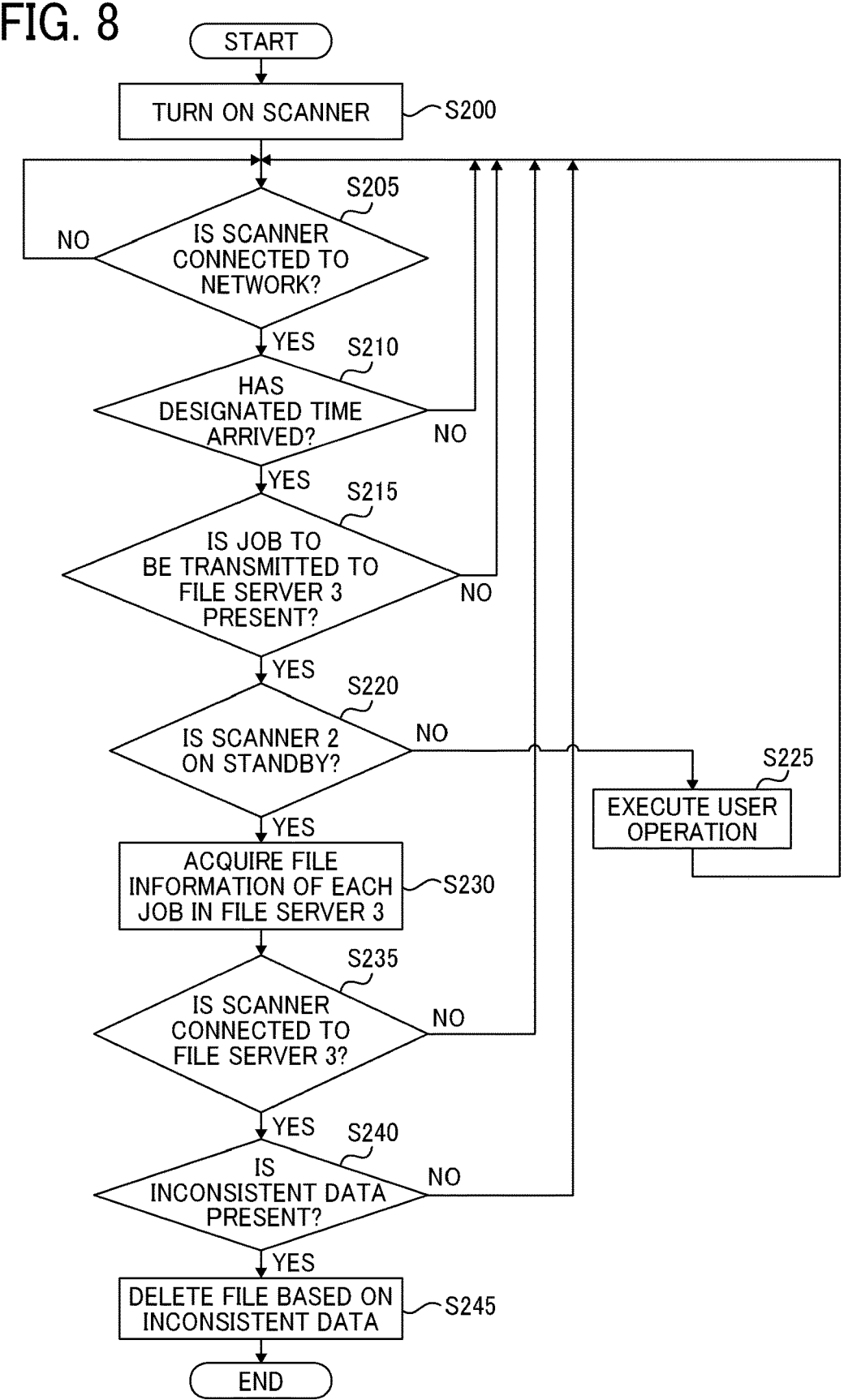
FIG. 8 is a flowchart of an operation of periodically deleting an inconsistent data list by the scanner of FIG. 3, according to an embodiment of the present disclosure.

FIG. 8 is a flowchart of an operation of periodically deleting an inconsistent data list (S20) by the scanner 2, according to the present embodiment.

In the present embodiment, a case is described in which an inconsistent data list remains without being deleted by another scanner 2.

In step 200 (S200), the scanner 2 is turned on according to a user's operation.

In step 205 (S205), the connection check unit 220 checks whether the scanner 2 is connected to the network 4. When the scanner 2 is connected to the network 4 (S205: Yes), the operation proceeds to S210. When the scanner 2 is not connected to the network 4, the operation returns to S205, and the connection is checked again.

In step 210 (S210), the time management unit 234 determines whether a designated time has arrived. When the time management unit 234 determines that the designated time has arrived (S210: Yes), the operation proceeds to S215. When the time management unit 234 does not determine that the designated time has arrived (S210: No), the operation returns to S205.

In step 215 (S215), the file writing unit 224 checks whether there is a job to be transmitted to the file server 3. When there is a job to be transmitted (S215: Yes), the operation proceeds to S220. When there is no job to be transmitted (S215: No), the operation returns to S205.

In step 220 (S220), the status acquisition unit 238 determines whether the scanner 2 is on standby. When the status acquisition unit 238 determines that the scanner 2 is on standby (S220: Yes), the operation proceeds to S230. When the status acquisition unit 238 determines that the scanner 2 is not on standby (S220: No), the operation proceeds to S225.

In step 225 (S225), the user's operation is executed, and the operation returns to S205.

In step 230 (S230), the file deletion unit 230 acquires file information of each job in the file server 3.

In step 235 (S235), the connection check unit 220 checks whether the scanner 2 and the file server 3 are connected to each other. When the scanner 2 and the file server 3 are connected to each other (S235: Yes), the operation proceeds to S240. When the scanner 2 and the file server 3 are not connected to each other (S235: No), the operation returns to S205.

In step 240 (S240), the file deletion unit 230 searches the file information acquired in S230 for an inconsistent data list. When the inconsistent data list is found (S240: Yes), the operation proceeds to S245. When no inconsistent data is found (S240: No), the operation returns to S205.

In step 245 (S245), the file deletion unit 230 creates a deletion command on the basis of a file name in the scan list as the inconsistent data list and a transmission destination folder path. The file deletion unit 230 transmits the deletion commands of each targe file and deletes the target files. When the deletion is completed, the deletion candidate deletion unit 228 deletes the inconsistent data list.

By periodically searching for an inconsistent data list and deleting the inconsistent data list, unnecessary files are prevented from remaining in the file server 3.

Figure 9:
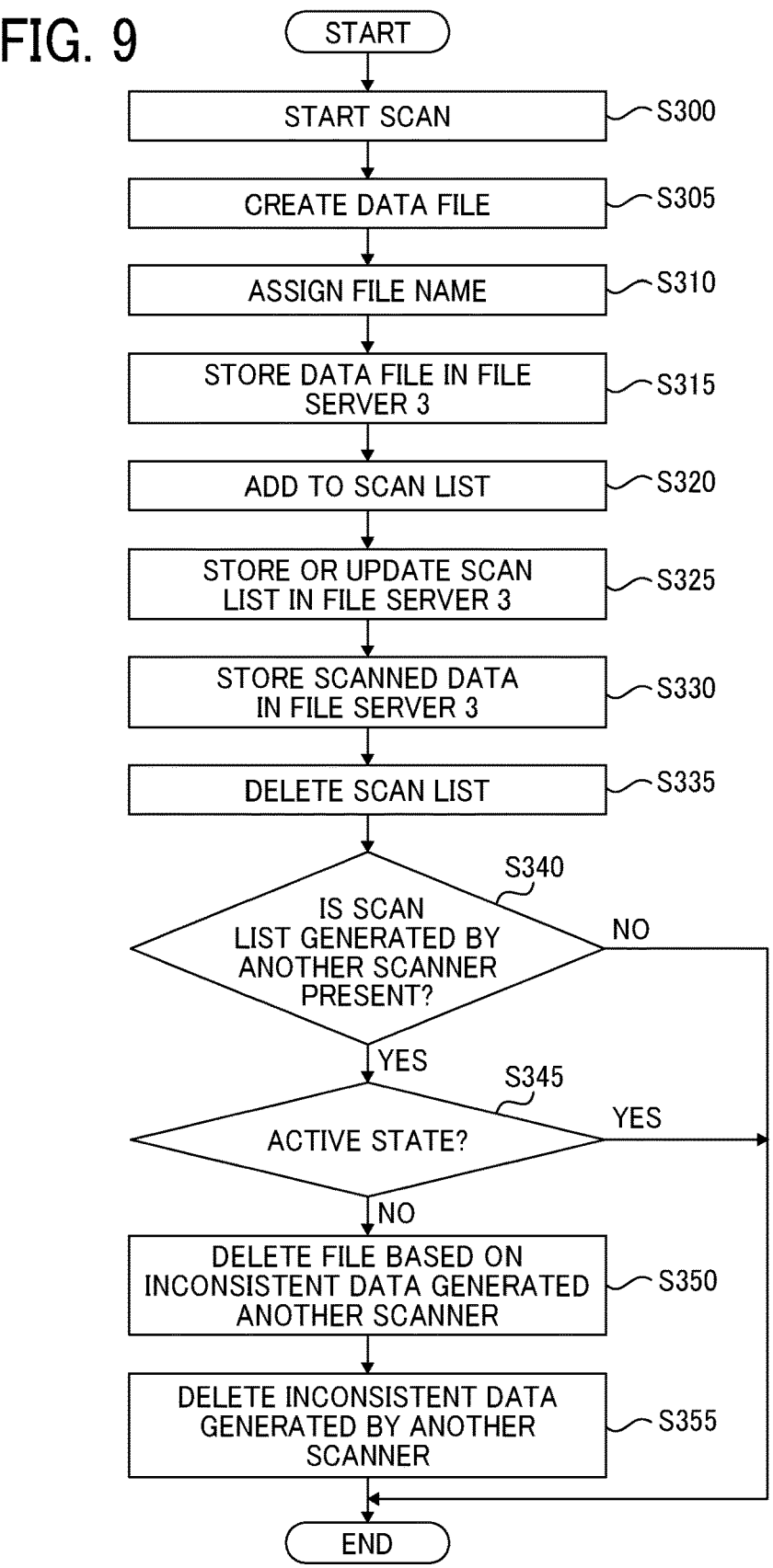
FIG. 9 is a flowchart of an operation of deleting an inconsistent data list generated by another scanner, according to an embodiment of the present disclosure.

FIG. 9 is a flowchart of an operation of deleting an inconsistent data list generated by another scanner 2 (S30), according to the present embodiment.

In the present embodiment, a case is described in which another scanner 2 performs scan processing in advance during scanning and another scan list is present in the file server 3.

In step 300 (S300), the file generation unit 222 of the scanner 2 scans a document.

In step 305 (S305), the file generation unit 222 generates a data file of the scanned document.

In step 310 (S310), the file generation unit 222 determines a file name of the generated data file in accordance with the naming rule, and assigns the determined file name to the data file.

In step 315 (S315), the file writing unit 224 stores the data file that is generated and named by the file generation unit 222 in the file server 3.

In step 320 (S320), the deletion candidate writing unit 226 adds identification information of the data file stored by the file writing unit 224 to the scan list.

In step 325 (S325), the deletion candidate writing unit 226 stores the scan list to which the identification information is added in the file server 3 or updates to the scan list.

In step 330 (S330), the user selects "Yes" in the window inquiring whether to store data obtained by scanning, and the detection unit 232 detects the user's selection. The file writing unit 224 stores the data file in the file server 3.

In step 335 (S335), the deletion candidate deletion unit 228 deletes the scan list from the file server 3.

In step 340 (S340), the file deletion unit 230 checks whether a scan list generated by another scanner 2 is present in the file server 3. When the scan list generated by another scanner 2 is present (S340: Yes), the operation proceeds to S345. When no scan list generated by another scanner 2 is present (S340: No), the operation ends.

In step 345 (S345), the active state determination unit 236 determines whether the scan list generated by another scanner 2 is in an active state. When the active state determination unit 236 determines that the scan list is in an inactive state (S345: No), the operation proceeds to S350. When the active state determination unit 236 determines that the scan list is in an active state (S345: Yes), the operation ends.

In step 350 (S350), the file deletion unit 230 identifies the scan list that is generated by another scanner 2 and remains in the file server 3 as an inconsistent data list, and the file deletion unit 230 creates a deletion command on the basis of a file name in the scan list as the inconsistent data list and a transmission destination folder path. The file deletion unit 230 transmits the deletion commands of each target file and deletes the target files.

In step 355 (S355), the deletion candidate deletion unit 228 deletes the inconsistent data list.

As described above, the scanner 2 deletes an unnecessary data file that has been transmitted to the file server 3, when scan processing is canceled during scanning of a document or transmission of the data file, when the data file is not stored after completion of the scanning, or when an error such as network disconnection occurs. Such a configuration can save a user from accessing the file server 3 from a terminal apparatus operated by the user himself/herself and checking a file name or opening a file to check a content of the file, to determine which file is to be deleted and perform deletion processing. This enhances work efficiency.

Modification

A modification of the above embodiment is described below.

In the above embodiment, a description is given of a case in which a data file is image data generated by the scanner 2. However, the image data is merely one example of the data file. Alternatively, the data file may be audio data or moving image data.

According to one embodiment of the present disclosure, a data file generation apparatus that deletes an unnecessary file transmitted at the time of reading or transmission cancellation is provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A data file generation apparatus coupled to a network server that includes a storage area, the data file generation apparatus comprising circuitry configured to:
   generate, in response to receiving a job requesting data files to be generated, the data files sequentially;
   store the generated data files in the storage area of the network server;
   generate a first data file list including first identification information associated with each data file of the generated data files, and store the first data file list in the storage area;
   delete, in response to completing the job, the first data file list from the storage area;
   delete, in response to a job canceling request, from the storage area, said each data file associated with the first identification information in the first data file list and the first data file list;
   identify a second data file list remaining in the storage area, wherein the second data file list is stored in the storage area of the network server by the circuitry of the data file generation apparatus, and remains in the storage area due to conditions, including a network connection error between the data file generation apparatus and the network server, which prevented the data file generation apparatus from (1) completing the job, (2) deleting the second file list from the storage area in response to completing the job, or (3) deleting the second data file list from the storage area in response to a job canceling request;

in response to the identifying the second data file list remaining in the storage area, generate a deletion command based on the second data file list; and control the network server, based on the deletion command, to delete from the storage area, one or more data files associated with second identification information in the identified second data file list and the identified second data file list.

2. The data file generation apparatus of claim 1, wherein the circuitry is further configured to scan documents to said generate the data files sequentially.

3. The data file generation apparatus according to claim 2, wherein the circuitry is further configured to:
assign a file name to the generated data files in accordance with a predetermined naming rule;
when storing the generated data files in the storage area, determine whether the file name is present in the storage area; and
in response to the determining that the file name is present in the storage area, add a serial number to an end of the assigned file name.

4. The data file generation apparatus of claim 1, wherein the circuitry is further configured to search the storage area for the second data file list at a predetermined timing.

5. The data file generation apparatus according to claim 4, wherein the predetermined timing is when the circuitry of the file generation apparatus establishes a connection with the storage area.

6. The data file generation apparatus of claim 1, wherein the circuitry is further configured to:
identify the second data file list remaining in the storage area; and
in response to the identifying of the second data file list remaining in the storage area, move one or more data files associated with the second identification information in the second data file list from the storage area to another storage area.

7. The data file generation apparatus according to claim 1, wherein the job canceling request includes a request to cancel the generating of the data files while the data files are being generated sequentially and a request to cancel storing the generated data files to the storage area after all the data files are generated.

8. The data file generation apparatus according to claim 1, wherein the circuitry is further configured to:
determine if the identified second data file list is in use by another data file generation apparatus, and
in response to determining that the identified second data file list is not in use by said another data file generation apparatus, said delete from the storage area, the one or more data files associated with the second identification information in the identified second data file list and the identified second data file list.

9. A data file generation method to be performed, via a network, between a data file generation apparatus and a network server that includes a storage area, the data file generation method comprising:
generating, in response to receiving a job requesting data files to be generated, the data files sequentially;
storing the generated data files in the storage area of the network server;
generating a first data file list including first identification information associated with each data file of the generated data files, and storing the first data file list in the storage area;

deleting, in response to completing the job, the first data file list from the storage area; and
deleting, in response to a job canceling request, from the storage area, said each data file associated with the first identification information in the first data file list and the first data file list;
identifying a second data file list remaining in the storage area, wherein the second data file list is stored in the storage area of the network server by the data file generation apparatus, and remains in the storage area due to conditions, including a network connection error between the data file generation apparatus and the network server, which prevented the data file generation apparatus from (1) completing the job, (2) deleting the second file list from the in response to completing the job, or (3) deleting the second data file list from the storage area in response to a job canceling request;
in response to the identifying the second data file list remaining in the storage area, generating a deletion command based on the second data file list; and
controlling the network server, based on the deletion command, to delete from the storage area, one or more data files associated with second identification information in the identified second data file list and the identified second data file list.

10. A non-transitory computer-executable medium storing a plurality of instructions which, when executed by a processor of a data file generation apparatus coupled to a network server via a network, causes the processor to perform a method comprising:
generating, in response to receiving a job requesting data files to be generated, the data files sequentially;
storing the generated data files in a storage area of the network server;
generating a first data file list including first identification information associated with each data file of the generated data files, and store the first data file list in the storage area;
deleting, in response to completing the job, the first data file list from the storage area;
deleting, in response to a job canceling request, from the storage area, said each data file associated with the first identification information in the first data file list and the first data file list;
identifying a second data file list remaining in the storage area, wherein the second data file list is stored in the storage area of the network server by the processor of the data file generation apparatus, and remains in the storage area due to conditions, including a network connection error between the data file generation apparatus and the network server, which prevented the data file generation apparatus from (1) completing the job, (2) deleting the second file list from the in response to completing the job, or (3) deleting the second data file list from the storage area in response to a job canceling request;
in response to the identifying the second data file list remaining in the storage area, generating a deletion command based on the second data file list; and
controlling the network server, based on the deletion command, to delete from the storage area, one or more data files associated with second identification information in the identified second data file list and the identified second data file list.

* * * * *